US012698120B2

(12) United States Patent
Fritz-Vietta et al.

(10) Patent No.: US 12,698,120 B2

(45) Date of Patent: Aug. 4, 2026

(54) METHOD FOR PRODUCING A RECESS IN A PACKAGING PIECE FROM A LEAF MATERIAL OF A PLANT

(71) Applicant: Leef Blattwerk GmbH, Potsdam (DE)

(72) Inventors: Claudio Pascal Fritz-Vietta, Berlin (DE); Daniele Grotto, Berlin (DE)

(73) Assignee: Leef Blattwerk GmbH, Potsdam (DE)

( * ) Notice: Subject to any disclaimer, the term of this patent is extended or adjusted under 35 U.S.C. 154(b) by 158 days.

(21) Appl. No.: 18/826,404

(22) Filed: Sep. 6, 2024

(65) Prior Publication Data

US 2025/0313369 A1 Oct. 9, 2025

(51) Int. Cl.

*B65B 61/00* (2006.01)
*B31B 50/14* (2017.01)
*B31B 110/10* (2017.01)

(52) U.S. Cl.

CPC .......... *B65B 61/005* (2013.01); *B31B 50/142* (2017.08); *B31B 2110/10* (2017.08)

(58) Field of Classification Search

CPC ............................ B65D 65/466; B65B 61/005
See application file for complete search history.

(56) References Cited

U.S. PATENT DOCUMENTS 3,917,352 A * 11/1975 Gageby .................. B29C 70/24 301/64.702
4,027,047 A * 5/1977 Harima .................... A23G 3/50 426/414
5,073,161 A * 12/1991 Weder .................... B65D 85/52 493/167
5,506,046 A * 4/1996 Andersen ............ B29C 49/0412 524/498

(Continued)

FOREIGN PATENT DOCUMENTS

DE 102011015331 A1 12/2011
DE 202017006954 U1 2/2019

(Continued)

*Primary Examiner* — Sean M Michalski
(74) *Attorney, Agent, or Firm* — Harness, Dickey & Pierce, PLC

(57) ABSTRACT

The present disclosure relates to a method for producing a recess in a packaging piece from a leaf material of a plant, comprising the following steps: providing a three-dimensionally shaped packaging piece from a leaf material of a plant; providing a negative mould with respect to the inner surface of the packaging piece, wherein the negative mould has a recess; placing the packaging piece onto the negative mould in such a way that the inner surface of the packaging piece abuts on the outer surface of the negative mould and the packaging piece is held on the negative mould using a punch which presses the packaging piece onto the negative mould, wherein the packaging piece covers the recess of the negative mould; and displacing a cutting tool from outside the packaging piece through the leaf material of the packaging piece into the recess of the negative mould, so that a recess in the packaging piece is produced, whereby the negative mould-supports the packaging piece when producing the recess in the packaging piece. Furthermore, a three-dimensionally shaped packaging piece and a packaging for an article are disclosed.

14 Claims, 2 Drawing Sheets

(56) References Cited

U.S. PATENT DOCUMENTS

Figure 1:
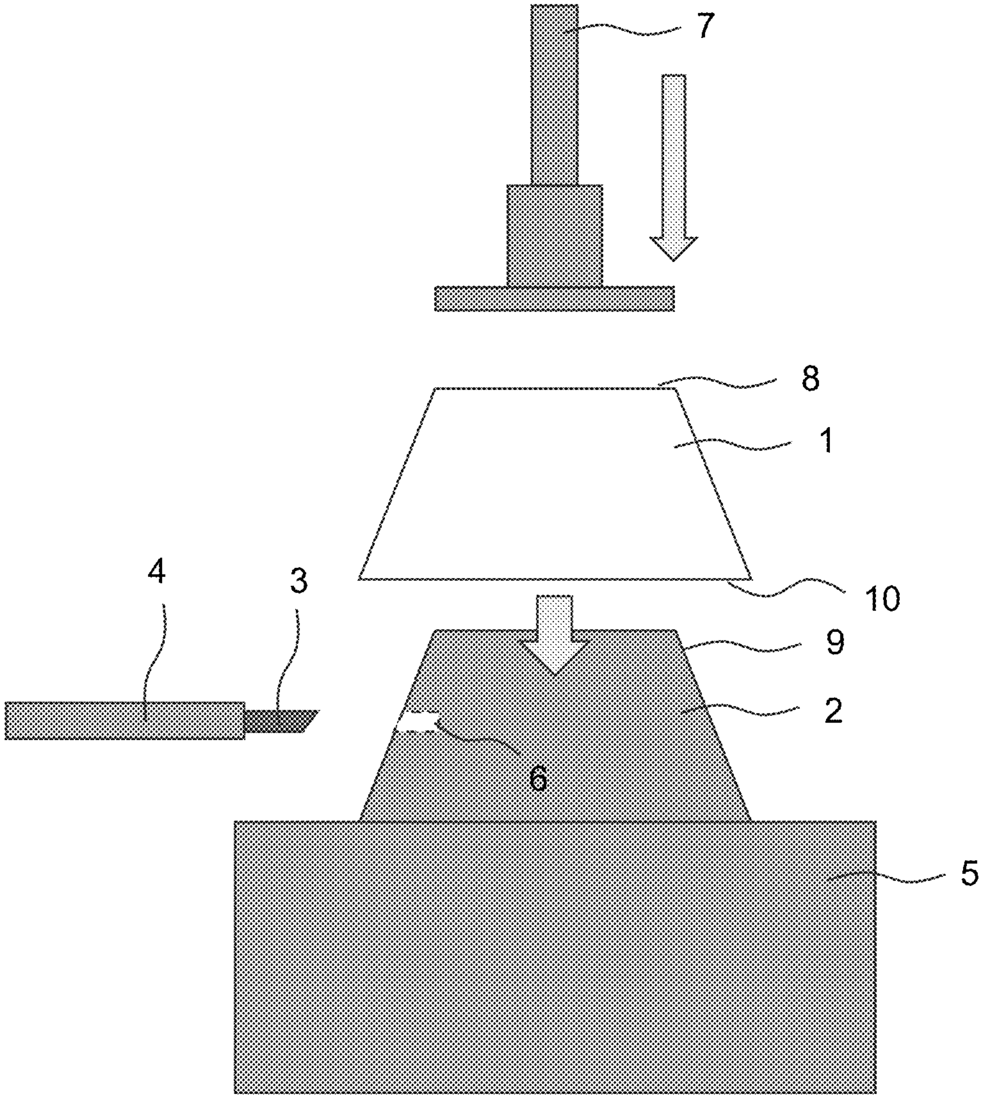

| | | | | |
|---|---|---|---|---|
| 5,617,708 | A * | 4/1997 | Weder | B65B 25/023 53/399 |
| 6,981,863 | B2 * | 1/2006 | Renault | B29C 51/12 425/290 |
| 2002/0086784 | A1 * | 7/2002 | Dai | B27N 5/00 493/58 |
| 2005/0183403 | A1 * | 8/2005 | Rodriguez | B29C 66/49 53/589 |
| 2016/0200501 | A1 * | 7/2016 | Lee | B65D 75/40 53/433 |
| 2016/0251131 | A1 * | 9/2016 | Edwards | C11D 17/049 206/524.7 |
| 2019/0381717 | A1 * | 12/2019 | Mansuino | B65B 51/225 |
| 2025/0171208 | A1 * | 5/2025 | Fritz-Vietta | B65D 43/0212 |

FOREIGN PATENT DOCUMENTS

| | | | |
|---|---|---|---|
| DE | 212022000231 | U1 | 3/2024 |
| EP | 4206088 | A1 | 7/2023 |

* cited by examiner

METHOD FOR PRODUCING A RECESS IN A PACKAGING PIECE FROM A LEAF MATERIAL OF A PLANT

CROSS-REFERENCE TO RELATED APPLICATIONS

This application claims the benefit of and priority to European Application No. 24168315.0, filed Apr. 3, 2024. The entire disclosure of the above application is incorporated herein by reference.

The invention relates to a method for producing a recess in a packaging piece from a leaf material of a plant, a three-dimensionally shaped packaging piece and a packaging for an article.

BACKGROUND

For packaging, articles such as food can be received in a container, for example a tray, a folding box or a cardboard, wherein the container is closed with a lid after insertion of the article. Various packaging materials for food are known (cf. for example DE 10 2011 015 331 A1).

In order to enable improved fixability of the packaging cover on the packing bottom and to support safe transport of the packaged article, fastening means are regularly provided on the container and on the lid, for example recesses and projections engaging in these recesses.

Depending on the shape and material of the workpiece, various techniques for producing recesses can be provided. In document DE 43 43 241 A1, a method for punching two eccentric holes into a tube wall by means of a punching punch is described. Document DE 1 866 721 U relates to a device for punching or punching hollow bodies, wherein a hollow mandrel is used which is mounted at one end in a height-adjustable and rotationally secured manner in a lateral extension arm of a machine body. In document WO 2019/076 575, a method for punching hollow bodies is disclosed, wherein the punching region is stiffened or supported from the inside.

Furthermore, in document DE 10 2012 014 096 B3, a method for producing slots in a tube wall with a plurality of punches arranged in a row is described, which are pierced through the tube wall, wherein an inner support of the tube is provided. Document EP 3 547 415 B1 relates to a 3D pattern puncher for a lithium metal electrode, in which a 3D pattern mold made of a polymer material is attached to a mold which punches a lithium metal electrode into individual electrodes. In document DE 2 907 414, a device for attaching sheet-metal passages for nut threads in hollow profiles is disclosed.

SUMMARY

The object of the invention is to specify a method for processing a packaging piece from a leaf material of a plant, in which a durable recess can be produced in the leaf material in an improved manner.

The object is achieved by means of the method for producing a recess in a packaging piece from a leaf material of a plant according to claim 1. Furthermore, a packaging piece and a packaging for an article are provided. Embodiments are the subject matter of dependent subclaims.

According to one aspect, a method for producing a recess in a packaging piece from a leaf material of a plant is provided, which comprises the following steps: providing a three-dimensionally shaped packaging piece from a leaf material of a plant; providing a negative mould with respect to the (entire) inner surface of the packaging piece, wherein the negative mould has a recess; placing the packaging piece onto the negative mould in such a way that the inner surface of the packaging piece abuts on the outer surface of the negative mould and the packaging piece is held on the negative mould using a punch which presses the packaging piece onto the negative mould, wherein the packaging piece covers the recess of the negative mould; and displacing a cutting tool from outside the packaging piece through the leaf material of the packaging piece into the recess of the negative mould, so that a recess in the packaging piece is produced, whereby the negative mould supports the packaging piece when producing the recess.

According to a further aspect, a three-dimensionally shaped packaging piece from a leaf material of a plant with a recess is provided, which was produced according to the method.

According to a further aspect, a packaging for an article is provided, comprising the packaging piece produced according to the method, wherein the packaging piece is configured to receive an article to be packaged, and a packaging cover which is fixed in its relative position to the packaging piece by means of a fastening means which interacts with the recess.

In the method, a negative mould of the packaging piece to be punched is used as a die in interaction with the punch for supporting the article with respect to the punching tool and also at the same time for holding the packaging piece. Through the formation as a negative mould which reproduces the shape (of the inner surface) of the packaging piece and distributes acting forces evenly over the entire packaging piece, a splinter-free production of the recess in the leaf material can be made possible. The method can thus allow the production of a packaging piece from leaf material of a plant, in which splinter formation in the leaf material, in particular around the recess, can be avoided or significantly reduced.

The leaf material can be a palm leaf material, for example a cutting of a palm leaf. The palm leaf material can be an *Areca* palm leaf material.

The leaf material can be a pressed leaf material. For example, the packaging piece can be produced by means of moulding in a moulding tool using pressure and elevated temperature.

The leaf material can be produced from a single leaf or a plurality of leaves, in particular palm leaf/palm leaves. The packaging piece can be formed in one piece.

The negative mould can be formed with a metal, in particular aluminium. The negative mould can consist (substantially) of the metal, in particular aluminium.

In general, the negative mould can be formed with a material having a modulus of elasticity of at least 10, in particular of at least 70 (at 20° C.) or consist thereof.

The negative mould can be formed in one piece. The negative mould can also be arranged on a base, which can be connected in one piece in particular to the negative mould. The base can form a stop for the packaging piece when placing it.

The negative mould and the (entire) inner surface of the packaging piece can be formed with a precise fit to one another. The packaging piece can rest (after placing) on the negative mould in a form-fitting manner. In other words, the packaging piece can rest on the negative mould in such a way that a relative movement is (substantially) blocked due to the inner surface of the packaging piece and the negative mould being formed with a precise fit to one another.

The punch can be pressed onto an outer bottom surface of the packaging piece in such a way that an inner surface of the packaging piece is pressed onto a corresponding counter surface of the negative mould. The counter surface can comprise a top surface of the negative mould and/or side surface(s) of the negative mould.

The bottom surface of the packaging piece can be formed quadrangularly (in particular rectangular or square). In addition or alternatively, the negative mould can have a quadrangular (in particular rectangular or square) top surface.

The bottom surface of the packaging piece can also be formed oval, round or polygonal. The negative mould can have an oval, round or polygonal top surface.

An opening of the packaging piece (for insertion of an article to be packaged) can span an area which is at least as large as, in particular larger than, an inner bottom surface of the packaging piece.

For example, the opening of the packaging piece can span an area which is at least 5% larger, in particular at least 10% larger, in particular at least 15% larger, than the inner bottom surface of the packaging piece.

The opening of the packaging piece can span an oval, round or polygonal (in particular quadrangular, especially square or rectangular) area.

The packaging piece and/or the negative mould can each be formed (substantially) cube-shaped, cuboid-shaped, prism-shaped, pyramid-shaped, truncated pyramid-shaped, cone-shaped, truncated cone-shaped, cylindrical or generalized cylindrical (as a general cylinder). In the case of a general cylinder, a cylinder base surface can be formed non-circularly or non-elliptically. For example, the cylinder base surface can be formed partially curved inwardly (concavely).

The negative mould can have a (substantially) convex shape.

Furthermore, the packaging piece can have an outwardly projecting packaging piece edge which is formed on a packaging piece side wall or a plurality of packaging piece side walls.

Furthermore, an inwardly raised projection surface can be formed in the packaging lid bottom (and in particular a corresponding recess surface on the top surface of the negative mould).

The packaging piece can be, for example, a container from the following group: tray, plate, cup and bowl.

The punch can press onto the packaging piece in a direction parallel to a (point) axis of symmetry or a (mirror) plane of symmetry of the packaging piece (and/or of the negative mould). In particular, the punch can press perpendicularly onto the packaging piece bottom or the outer bottom surface. Alternatively, other angles can be provided. A punch surface can be oriented parallel to the packaging piece bottom when the punch is pressed onto the packaging piece.

The cutting tool can be displaced in a direction perpendicular, parallel or diagonal to a (point) axis of symmetry or a (mirror) plane of symmetry of the packaging piece (and/or of the negative mould).

The cutting tool can be displaced in a direction perpendicular to the packaging piece side wall. Alternatively, the displacement can also be carried out in a direction diagonal to the packaging piece side wall.

The cutting tool can be formed such that it can be moved into the recess with a precise fit. The cutting tool can have one or more of a blade, a hollow mandrel, a solid mandrel, or a wedge.

The recess (of the mould) can be formed in the side surface/one of the side surfaces of the negative mould. The recess can have a polygonal, quadrangular, quadrangular with rounded corners, rectangular, square, oval, or circularly formed opening surface. The recess can be formed continuously or have a plurality of (spaced apart) partial recesses. Accordingly, the cutting tool can be formed in one or more parts.

The recess (of the packaging piece) can be produced spaced apart from an edge of the packaging piece. Alternatively, the recess can be produced as a cutout at the edge of the packaging piece. The recess can be produced continuously (through the packaging piece).

The recess (of the packaging piece) can be produced in a (substantially) planar section of the packaging piece.

The cutting tool can be displaced by means of a pneumatic press. In this manner, the cutting tool can be displaced rapidly by means of a higher possible flow velocity of compressed air used. Furthermore, a clean production process can be made possible on account of the compressed air used, which can be advantageous in particular for food to be packaged.

Alternatively, the cutting tool can be displaced by means of a hydraulic press.

Furthermore, the punch can be pressed onto the packaging piece by means of a further pneumatic press or a further hydraulic press.

The method can comprise moving the cutting tool out of the recess. The method can furthermore comprise rotating the cutting tool and the packaging piece (together with the negative mould and optionally the punch) with respect to one another, for example rotating the cutting tool (and/or the negative mould together with the packaging piece and optionally the punch). Furthermore, the method can comprise displacing the cutting tool through the leaf material of the packaging piece into the (same) recess of the negative mould, so that a further recess is produced in the packaging piece.

DESCRIPTION OF EXEMPLARY EMBODIMENTS

Figure 2:
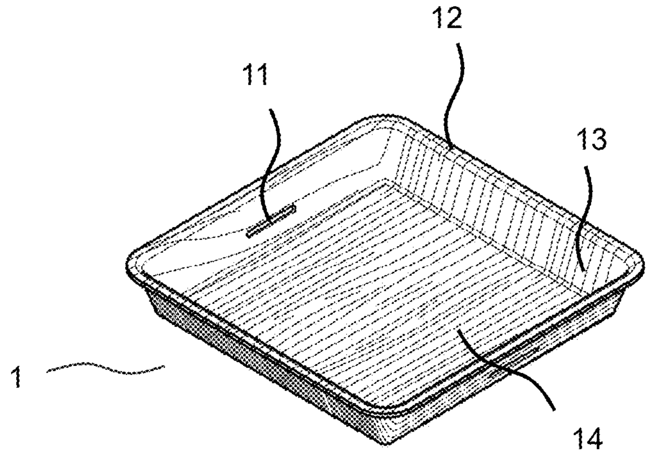
Figure 3:
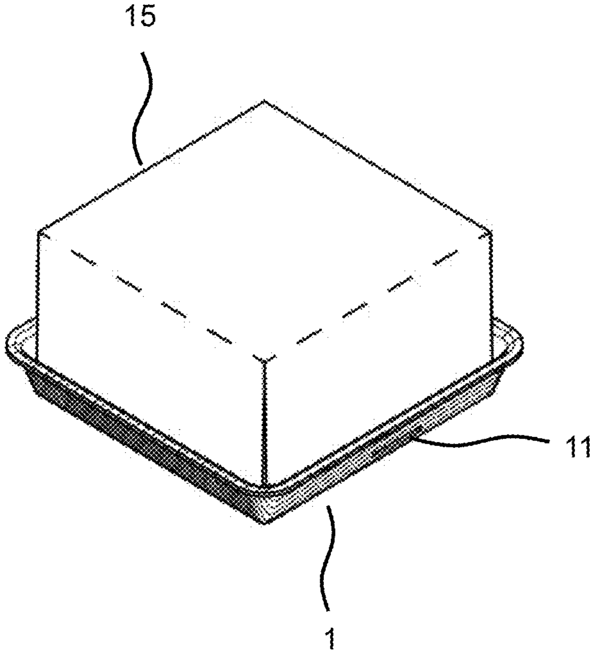

Further exemplary embodiments are explained in more detail below with reference to drawings. In the drawings:

FIG. 1 shows a schematic representation for producing a recess in a packaging piece, FIG. 2 shows a schematic representation of a packaging piece, and FIG. 3 shows a schematic representation of a packaging for an article.

FIG. 1 shows a schematic representation for producing a recess 11 in a packaging piece 1. A three-dimensionally shaped packaging piece 1 from a leaf material of a plant and a negative mould 2 of the inner surface of the packaging piece 1 are provided on a base 5.

The negative mould has a recess 6 at a location at which a recess 11 is to be produced in the packaging piece 1. The packaging piece 1 is placed onto the negative mould, so that the inner surface of the packaging piece 1 abuts on the outer surface of the negative mould 2 and the packaging piece 1 is held on the negative mould 2 in a form-fitting manner by means of a punch 7 which presses the packaging piece 1 onto the negative mould 2. At the same time, the packaging piece 1 is supported by the negative mould 2. In particular, the punch 7 is pressed onto an outer bottom surface 8 of the packaging piece 1 in such a way that an inner surface of the packaging piece 1 is pressed onto a corresponding counter surface 9 of the negative mould 2. By increasing the area of the opening 10 of the packaging piece 1 with respect to the bottom surface of the packaging piece 1 (and corresponding shaping of the negative mould 2), the placing can be simplified and the holding of the packaging piece 1 on the negative mould 2 can be improved.

To produce the recess 11 in the packaging piece 1, a cutting tool 3 is displaced by means of a pneumatic press 4 through the leaf material of the packaging piece 1 into the recess 6 of the negative mould 2. Alternatively, the cutting tool 3 can also be displaced by means of a hydraulic press.

FIG. 2 shows a schematic representation of a packaging piece 1 which has recesses 11 produced by means of the method and a packaging piece edge 12 which is formed on a packaging piece side wall 13 and a packaging piece bottom 14.

FIG. 3 shows a schematic representation of a packaging for an article which has the packaging piece 1 and furthermore a packaging cover 15. The packaging cover 15 is fixed in its relative position to the packaging piece 1 by means of a fastening means (for example a projection on the packaging cover 15) which interacts with the recess 11. The packaging cover 15 can be produced, for example, from paper, a cardboard material or also a leaf material (of a plant). Alternatively, another material can also be provided for the packaging cover 15.

The features disclosed in the above description, the claims and the drawing can be of significance both individually and in any desired combination for the realization of the various embodiments.

| Reference Sign List | |
|---|---|
| 1 | Packaging piece |
| 2 | Negative |
| 3 | Cutting tool |
| 4 | Pneumatic press |
| 5 | Base |
| 6 | Recess |
| 7 | Punch |
| 8 | Outer bottom surface |
| 9 | Counter surface |
| 10 | Opening of the packaging piece |
| 11 | Recess |
| 12 | Packaging piece edge |
| 13 | Packaging piece side wall |
| 14 | Packaging piece bottom |
| 15 | Packaging cover |

The invention claimed is:

1. Method for producing a recess in a packaging piece from a leaf material of a plant, comprising the following steps:

providing a three-dimensionally shaped packaging piece from a leaf material of a plant;

providing a negative mould with respect to the inner surface of the packaging piece, wherein the negative mould has a recess;

placing the packaging piece onto the negative mould in such a way that the inner surface of the packaging piece abuts on the outer surface of the negative mould and the packaging piece is held on the negative mould using a punch which presses the packaging piece onto the negative mould, wherein the packaging piece covers the recess of the negative mould; and displacing a cutting tool from outside the packaging piece through the leaf material of the packaging piece into the recess of the negative mould, so that a recess in the packaging piece is produced, whereby the negative mould supports the packaging piece when producing the recess in the packaging piece.

2. The method according to claim 1, wherein the leaf material is a palm leaf material.

3. The method according to claim 1, wherein the negative mould is formed with a metal.

4. The method according to claim 1, wherein the negative mould is formed in one piece.

5. The method according to claim 1, wherein the packaging piece rests on the negative mould in a form-fitting manner.

6. The method according to claim 1, wherein the punch is pressed onto an outer bottom surface of the packaging piece such that an inner surface of the packaging piece is pressed onto a corresponding counter surface of the negative mould.

7. The method according to claim 6, wherein the bottom surface of the packaging piece is formed quadrangularly and the negative mould has a quadrangular top surface.

8. The method according to claim 1, wherein an opening of the packaging piece spans an area which is at least as large as an inner bottom surface of the packaging piece.

9. The method according to claim 1, wherein the packaging piece and the negative mould are each formed cube-shaped, cuboid-shaped, prism-shaped, pyramid-shaped, truncated pyramid-shaped, cone-shaped, truncated cone-shaped, cylindrical or generalized cylindrical.

10. The method according to claim 1, wherein the punch presses onto the packaging piece in a direction parallel to an axis of symmetry or a plane of symmetry of the packaging piece.

11. The method according to claim 1, wherein the cutting tool has a blade which is formed such that it can be moved into the recess with a precise fit.

12. The method according to claim 1, wherein the recess is produced spaced apart from an edge of the packaging piece.

13. The method according to claim 1, wherein the cutting tool is moved by means of a pneumatic press or a hydraulic press.

14. A three-dimensionally shaped packaging piece from a leaf material of a plant with a recess, produced according to a method according to claim 1.

* * * * *